Nov. 4, 1952          R. H. HUNTER          2,616,451

TEMPERATURE CONTROL SYSTEM

Original Filed Nov. 10, 1943          2 SHEETS—SHEET 1

INVENTOR.
BY R. H. Hunter

ATTORNEYS

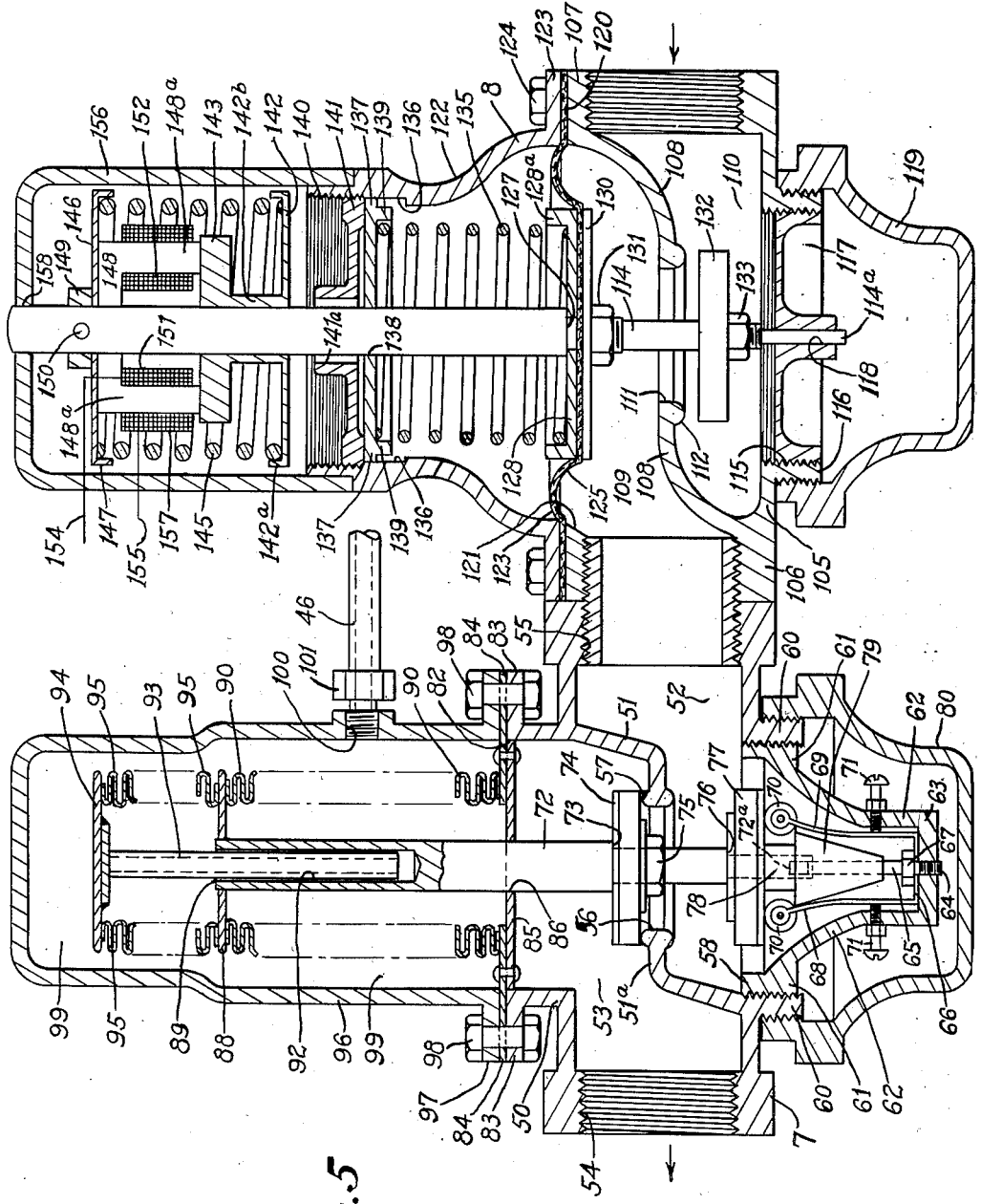

Patented Nov. 4, 1952

2,616,451

UNITED STATES PATENT OFFICE 2,616,451

TEMPERATURE CONTROL SYSTEM

Rutherford H. Hunter, Wooster, Ohio

Original application November 10, 1943, Serial No. 509,697. Divided and this application January 24, 1948, Serial No. 4,102

4 Claims. (Cl. 137—688)

1

This invention relates to improvements in automatically operable thermostatic apparatus using the cubical expansion of a vaporized volatile fluid to produce a mechanical result, and this application is a division of my copending application Serial No. 509,697, filed November 10, 1943, matured in Patent No. 2,437,468, dated March 9, 1948. While intended to be used generally wherever it may be advantageously employed, the invention is particularly adapted for accurately controlling a source of heat to produce and maintain a desired temperature condition in an enclosed space.

The objects of the invention are to provide an improved pressure generator which includes a casing to be located within the space where a controlled temperature is desired, the casing closely confining a volatile liquid in which is mounted a bellows or hollow contractible element which is completely filled with a non-compressible liquid. The invention also aims to provide an improved valve and quick acting valve operating mechanism, the valve being interposable in a fuel line of a burner for heating said space and which includes a bellows or a suitable fluid operated means connected by a line to said pressure generator and to coordinate the operation of said elements with other elements herein disclosed to provide a highly efficient system of temperature control.

A further object is to provide a temperature controlled apparatus of economical construction which will be strong and durable and can be conveniently regulated to accurately maintain a desired temperature in a room or other enclosed space.

The above objects are accomplished and other obvious advantages attained by the novel construction, combination and arrangement of parts hereinafter described with reference to the accompanying drawing in which there is illustrated a preferred embodiment of the invention, it being understood that the same may be changed or modified to adapt it to particular conditions and that equivalent elements may be substituted which come within the scope of the appended claims.

In the drawings:

Figure 5 is a central vertical sectional view of the valves provided by this invention for controlling the flow of fuel to a burner or other heat producing means.

Figure 3:
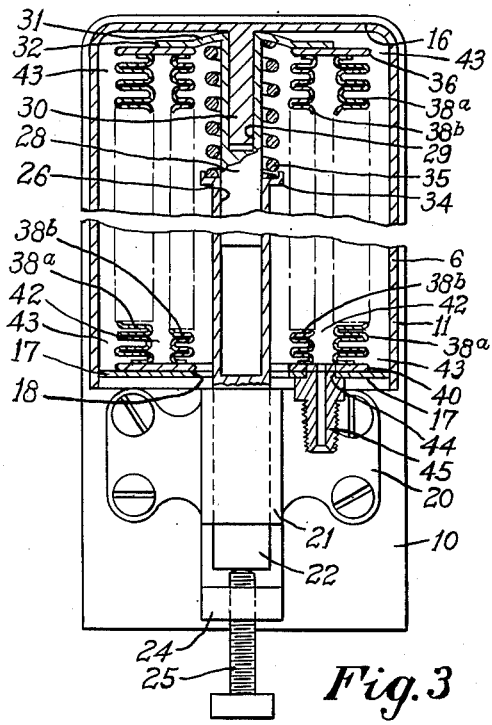
Figure 3 is a vertical cross-sectional view partly in front elevation, taken as indicated by the line 3—3 of Figure 2.
Figure 1:
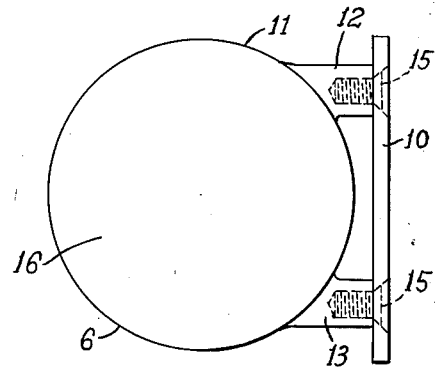
Figure 1 is a top plan view of a thermostatic pressure generator constructed in accordance with this invention.
Figure 4:
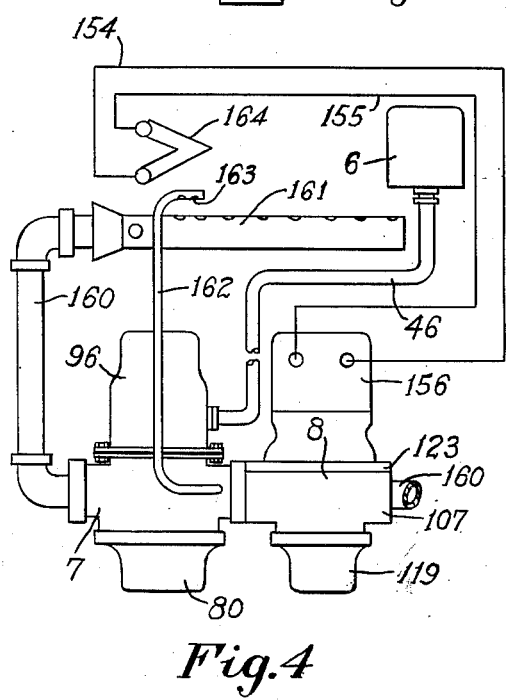
Figure 4 is a diagrammatic view showing in side elevation one method of operatively connecting the improved valves of this invention to a fuel line.
Figure 2:
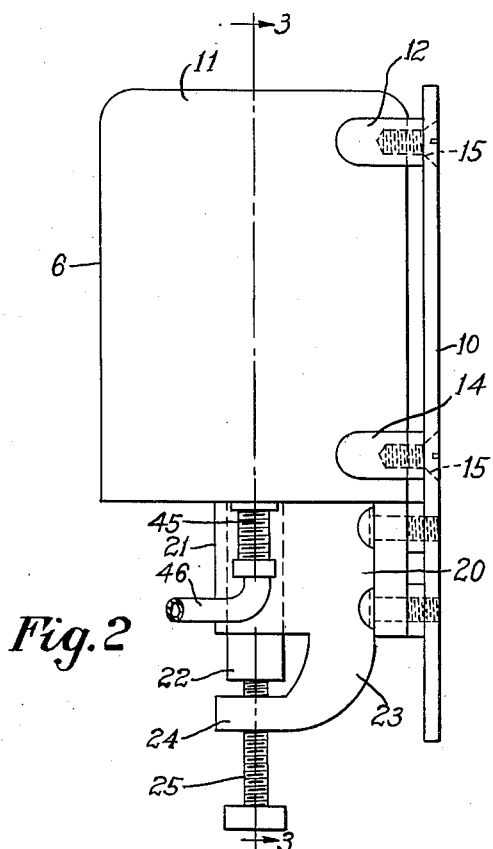
Figure 2 is a side elevational view of same.

Proceeding now to a detailed description of the particular apparatus disclosed in the drawing, numeral 6 is used generally to denote a pressure generator which is located in the space in which a certain degree of temperature is to be maintained. The numeral 7 denotes an improved valve which is interposed in the fluid line of a burner of a furnace or other apparatus for heating said space, and the numeral 8 denotes a thermocouple electrically operated valve which is controlled by the pilot light of said burner.

As shown in the drawings, the pressure generator 6 has a back plate 10, a cylindrical casing 11, having rearwardly projecting posts 12, 13 and 14 secured to said back plate by means of the screws 15 which are threaded in said posts. The casing 11 has an integrally formed top wall 16, completely closing the upper end thereof and a disc 17, having a central opening 18, which is welded, brazed or otherwise impermeably secured in the lower end of said casing.

The numeral 20 denotes a bracket which is secured to the back plate 10 to project forwardly beneath the lower end of the casing 11. The bracket 20 has a vertically arranged tubular portion 21 which is co-axially arranged relative to the opening 18 and which is provided with a vertical bore in which is slidably mounted a shaft 22.

The bracket 20 includes a lug which curves downwardly and forwardly and terminates in a horizontal portion 24. The horizontal portion is provided with a threaded bore (not shown) in which is mounted from the lower end thereof a screw 25 to engage the lower end of the shaft 22. The shaft 22 projects upwardly into the cavity of the casing and is provided with an axial bore 26 which extends therein from the upper end thereof. An upper shaft 28 is slidably mounted in the bore 26 and projects upwardly beyond the shaft 22. The upper end portion of the shaft 28 is provided with an axial bore 29 in which is mounted the guide pin 30 which is secured to the upper wall 16 of the casing 11 whereby the shaft 28 is slidably movable therein. The shaft 28 terminates at the upper end thereof in an upwardly bulged disc 31 which has a horizontal marginal portion 32 disposed concentrically in the casing 11.

The shaft 22 is provided on the upper end thereof with an outwardly projecting annular shoulder 34 which forms the seat for the lower end of a coil spring 35 which is mounted on the shaft 28 for compression between the shoulder 34 and the disc 31, the screw 25 being operable to regulate said compression.

A flat annular washer 40 is welded, brazed or otherwise secured to the lower wall 17. The lower edge portion of the walls 38a and 38b are soldered, brazed or otherwise secured to the washer 40 to form a fluid-tight annular cavity 42 between said walls. The space 43 which surrounds the bellows 38 is also fluid tight and contains a volatile fluid prepared to vaporize at a certain selected temperature. A threaded bore 44 extends through the washer 40 and wall 17 and a suitable nipple 45 is threaded in said bore to communicate with the annular cavity 42. A tube 46 is connected to the nipple 45 and leads to the valve operating means hereinafter described.

In Figure 5 there is shown a preferred form of the improved valve 7 which, as shown, has a tubular valve body 50 which is of conventional design with a partition 51 dividing the cavity of said body into an inlet cavity 52 and outlet cavity 53. A threaded inlet opening 55 leads to the cavity 52 and a threaded outlet opening 54 leads from the cavity 53.

The central portion 51a of the partition is horizontal and is provided with an opening 56 having an annular valve seat 57 disposed around said opening on the upwardly presented side thereof. The body 50 is provided on the lower side thereof with an enlarged opening 58 which communicates with the cavity 52. A downwardly projecting internally and externally threaded nipple 60 surrounds said opening 58. A yoke ring 61 is threaded in said nipple and a yoke 62 depends from said ring and terminates in a horizontal portion 63. The horizontal portion 63 is provided with a centrally positioned threaded bore 64 and a pin 65 is threaded therein to project upwardly therefrom. A spring member 66 is secured to the bottom of the yoke 62 by the pin 65, and a nut 67 being threaded on said pin to hold the spring member 66 against the horizontal member 63. The end portions of the spring 66 project upwardly from the member 63 to form the spring arm 68 and 69. Each of the arms 68 and 69 are provided on the upper end thereof with a roller 70. The yoke is provided with screws 71 which may be operated against the spring arms 68 and 69 to regulate the tension thereof.

The numeral 72 denotes a valve stem which is positioned in said body and extends co-axially through the opening 56. The stem is reduced in diameter adjacent to said opening to provide a downwardly positioned shoulder 73 against which a valve disc 74 is secured by a nut 75. The lower portion of the stem 72 is reduced in diameter to form a shoulder 76 against which is secured a disc 77 by a collar 78 which bears against the lower face thereof and is suitably secured thereto. An inverted truncated cone 79 is mounted on the lower end of the reduced lower end portion of the shaft 72. The cone 79 and the lower end portion of the shaft 72 is provided with a bore 72a in which is slidably received the pin 65. A cover 80 is threaded on the nipple 60 to completely enclose the mechanism above-described.

The body 50 is provided on the upper side thereof with an opening 82 which communicates with the cavity 53 and a flange 83 projects outwardly from said opening to provide a support for the bonnet hereinafter described. A washer 84 is positioned on said flange and a solid wall 85 is secured to the under side of said washer to completely close the opening 82. The wall 85 is provided with a centrally positioned opening 86 in which the shaft 72 is slidably received.

A disc 88 having a central opening 89 is secured to the upper end of the shaft 72 and a bellows 90 is co-axially positioned around the shaft 72 with its upper end soldered, brazed or otherwise secured to the disc 88 and its lower axial end likewise secured to the washer 84. The bellows 90 is preferably composed of copper but may be formed of any suitable material and is provided with closely spaced, deep circumferential corrugations so as to be readily expandable or contractible as hereinafter described.

The shaft 72 is provided with an axial bore 92 which extends therein from the upper end thereof as shown in Figure 5 and a guide shaft 93 is slidably mounted in the bore 92. The shaft 93 has a disc 94 secured to the upper end thereof to form the upper wall of the snap bellows 95. The bellows 95 is similar to the bellows 90 and has its upper end soldered, brazed or otherwise secured to the disc 94 and its lower end likewise secured to the washer 88. The shaft 93 extends into the bore 92 to a point adjacent the end thereof so that a contraction of the bellows 95 will force the shaft 93 against the bottom of said bore and exert a downward force on the shaft 72.

Numeral 96 denotes a bonnet or casing open at the lower end and provided at said open end with a flange 97 which corresponds in outline to the flange 83 and is secured thereto by the bolts 98 to hold the washer 84 in place and form a fluid-tight joint there between. The bonnet 96 thus encloses a fluid-tight space 99 which surrounds the circumferential and upper axial sides of the bellows 90 and 95. The bonnet 96 is provided with a threaded bore 100 in which is threaded connecting means 101 for securing the tube 46 thereto in communication with the space 99.

The valve 8 is provided with a hollow valve body 105 having an internally threaded outlet nipple 106 and a similar inlet nipple 107. A partition 108 divides the cavity of the body 105 into an outlet chamber 109 and an inlet chamber 110. The central portion of the partition is horizontal and provided with an opening 111. A valve seat 112 surrounds the opening 111 on the lower side of said partition 108. A valve stem 114 is positioned in said body to extend co-axially through said opening. The body 105 is provided on the lower side thereof with an opening 115 and a cylindrical externally and internally threaded nipple 116 surrounds said opening and projects downwardly therefrom. A closure 117 is threaded in the nipple 116. The member 117 has a thickened central portion provided with a bore 118 in which is slidably mounted the reduced lower end 114a of the stem 114. The numeral 119 denotes a cover which is threaded on the nipple 116 to completely close the mechanism above-described.

The body 105 is provided on the upper side thereof with a flat face 120 and with an enlarged opening 121. A tubular section 122 provided at the lower edge thereof with an outwardly projecting circumferentially extending flange 123 which is secured to the marginal portions of the face 120 by the bolts 124 and with the cavity of said tubular portion coinciding with the opening 121. A flexible diaphragm 125 is positioned on the flat face 120 to completely close the opening 121, the marginal portions of said diaphragm being tightly impinged between the flange 123 and the face 120.

The valve stem 114 is offset larger as at 127 to form a downwardly presented shoulder against which is positioned a disc 128. The central portion of the diaphragm is provided with an opening through which said valve stem 114 extends and the central portion of said diaphragm is held against the lower side of said disc 128 by the washer 130, a nut 131 being operated on said stem 114 to tightly impinge the central portion of the diaphragm between the disc 128 and washer 130 and secure the same in tight contact with the shoulder indicated at 127. The diaphragm 125 is preferably formed of strong flexible impermeable material and the portion thereof extending between the disc 128 and the edge of the opening 121 is in a free or unstretched condition which will permit free movement of the stem 114. The reduced lower end portion 114a of the stem 114 extends upwardly to a plane below the valve seat 112 to form a downwardly presented shoulder against which the valve head 132 is securely held by the nut 133 which is threaded on said stem.

The disc 128 is provided with an upstanding circumferentially extending flange 128a to form a seat for the coil spring 135. The upper portion of the cavity of the section 122 is provided with a smooth cylindrical wall 136 and a washer 137 having a central aperture 138 is mounted on the stem 114 with the peripheral edge of the washer slidably contacting said wall 136.

The washer 137 is provided with a concentrically arranged depending flange 139 which forms a seat for the upper end of the spring 135.

The upper portion 140 of the section 122 is internally threaded and a pressure regulating wheel 141 having a thick rim portion with a threaded peripheral face is operatively threaded in said threaded portion 140. The wheel member 141 has an upwardly projecting hub 141a through which the shaft 114 projects; a washer 142 having a hub 142b which projects upwardly therefrom is slidably mounted on the shaft 114 above the upper edge of the section 122. The hub 142b is enlarged at the upper end thereof to form an armature 143. The washer 142 is provided with a circumferentially extending flange 142a which forms a seat for the coil spring 145 which is mounted thereon. The upper end of the spring 145 bears against a disc 146 which is fixed to the upper end of the shaft 114. The disc 146 is provided with a depending flange 147 to form a seat for the upper end of said spring 145. An electro-magnet 148 is also secured to the upper end portion of said shaft immediately below the disc 146, a fastening member 149 being detachably secured to the upper end of said shaft 114, to securely hold the disc 146 thereon. The electro-magnet 148 as illustrated includes the coils 151 and 152 and suitable core members 148a, but may be of any suitable construction. The magnet 148 is connected by the wires 154, 155 in an electric circuit hereinafter described.

It will be seen that the wheel 141 may be operated in the threaded barrel 140 so that the rim portion thereof will bear against the disc 137 and regulate the tension of the spring 135 or it may be operated to move the hub 141a against the washer 142 and regulate the tension of the spring 145. When the magnet 148 is de-energized the pressure of spring 145 holds washer 142 against hub 141a and urges washer 146 and shaft 114 secured thereto upward to close valve 132, overcoming the downward pressure of spring 135 which tends to open the valve.

The section 122 is offset smaller at the upper end thereof and a suitable hood 156 is threaded thereon to enclose the mechanism above-described. The hood 156 is provided in the upper wall thereof with a central opening 158, through which the upper end of the shaft 114 projects.

In use, the pressure generator 6 is mounted in the room or space to be heated and the valves 7 and 8 are operatively interposed in the fuel line 160 leading to the burner 161 of a furnace or other apparatus for heating the space in which the pressure generator is mounted, one end of a tube 46 is connected to the nipple 45 with the other end connected to the member 101 whereby the bore of the tube 46 communicates with the cavity 42 and with the space 99. A tube 162 is connected to the valve 7 to communicate with the space 52 or 109. In the drawings, the tube is shown as connected to the valve 7 to communicate with the inlet cavity 52, but it may be connected to said valves or to the line 160 in any suitable manner. The tube 162 leads to the burner 161 and is provided in the free end thereof with suitable openings 163 to form a pilot light.

The numeral 164 denotes a thermopile which may be of any suitable construction but is preferable of the compound type. The wires 154 and 155 are connected to the thermopile 164 and lead to the coils 151 and 152 to complete a circuit for the electricity generated by the thermopile 164 when the pilot light 163 is lit.

The space 43 is filled or partly filled with a volatile liquid and the space 42 the tube 46 and the space 99 with oil, alcohol or other noncompressible liquid.

The projecting portion of the stem 114 is pressed downwardly to open the valve 132 and the pilot light formed by the tube 162 is ignited. The heat generated by the pilot light generates sufficient electricity in the thermopile 162 and energizes the coils 151 and 152 causing the cores 148a to hold the armature 143 in the inoperative position shown in Figure 5. This allows the downward pressure of the spring 135 to hold the valve 132 in an open position.

As the heat generated by the burner 161 is conducted to the space in which the pressure generator 6 is positioned, it causes the fluid in the space 43 to volatilize and the vapor thereof to expand. The pressure of the expanding vapor exerts a force on the bellows 38 and compresses the bellows in accordance with the temperature of the room. This compression causes the liquid in the cavity 42 to be forced into the tube 46 and into the space 99 which compresses the bellows 90 and 95 in accordance with the temperature of the volatile liquid in the space 43.

As the temperature of the room rises, the stem 72 is forced downwardly with the spring pressed rollers 70 contacting the conical surface of the member 79 to restrain the closing movement of the valve until the valve head 74 is close to the seat 57. As the valve head 74 nears a closed position, the conical member 79 is forced to a position where the rollers 70 snap over the upper edge of the said member, thus releasing the restraining load of the spring arms 68 and 69, whereupon the compressed air in the snap bellows 95 will quickly complete the closing movement.

As the temperature of the room lowers, the volatile liquid in the space contracts and the spring 35 expands the bellows 38 thus drawing the liquid from the space 99 to the space 42. As the rollers 70 are positioned over the upper edge of the conical member 79, a slight release of pressure will not open the valve, but when the pressure has been reduced to a certain point, the compressed air in the snap bellows 95 will cause the valve 74 to snap to an open position.

The pressure generator 6 may be accurately regulated by operating the screw 25 and the operation of the valve 7 regulated by adjusting the screws 71. The stem 72 is mounted for free sliding movement in the bore 86 which permits air or gas to flow freely to and from the interior of the bellows 90.

It will thus be seen that this invention provides simple inexpensive means for accurately regulating the operation of heating apparatus to heat and maintain the atmosphere of a room or other space at a certain selected temperature.

The operation of the valve 8 may be initially regulated by operating the wheel 141 in the threaded portion 140.

When the valve 74 is closed, the pilot light 163 will heat the thermopile 164 and generate sufficient electricity to hold the spring 145 in a compressed or inoperative position. If, however, the supply of fuel is for any reason discontinued, the magnet formed by the coils 151 and 152 will release the armature 143 and the spring 145 will raise the stem 114 and close the valve 132, thus preventing the escape of gas until the valve 132 is opened by manually depressing the stem 114 and igniting the pilot light 163.

While the valves 7 and 8 are described as two separate devices, they operate as a single unit to produce a desired, highly important result and that the pressure regulator 6 operates with the valves 8 and 9 to produce this result.

Having thus illustrated a particular adaptation of my invention, what I claim as new and desire to secure by Letters Patent is:

I claim:

1. In a pressure operated valve, a hollow valve body, a partition in said body, said partition having a valve opening, a valve stem extending coaxially through said opening; a cylindrical bellows having a collapsible side wall and an end wall, said stem extending through said bellows with the upper end thereof secured to said end wall, a casing enclosing a fluid-tight space around said bellows, a tube connected to said casing for conducting a fluid to and from said space; a second bellows mounted in said casing on the first named bellows, said second bellows filled with a compressible gas; a valve head on said stem, said stem projecting through said valve head and valve opening; an inverted frustro-conical member coaxially secured to the downwardly projecting end of said stem, spring pressed rollers bearing against the sides of said member to restrain a closing movement of said valve; said rollers positioned to snap over the upper edge of said member when the valve is moved close to a closed position whereupon the force of the compressed gas in said second bellows will quickly close said valve.

2. In a pressure operated valve, a hollow valve body, a partition in said body, said partition having a valve opening; a valve stem extending coaxially through said opening; a cylindrical bellows having a longitudinally foldable side wall and an end wall; said valve stem secured to said end wall; a casing enclosing a fluid-tight space around said bellows; a tube connected to said casing for conducting a fluid under pressure to said space; a snap bellows mounted on the first named bellows, said snap bellows filled with air or the like; spring pressed means for retarding a closing movement of said valve, said retarding means automatically releasable when the valve is near a closed position, whereupon the force of air compressed in said snap bellows will quickly complete the closing movement of said valve.

3. In a pressure operated valve, a hollow valve body, a partition in said body, said partition having a valve opening, a valve stem extending coaxially through said opening; a cylindrical bellows having a longitudinally foldable side wall and an end wall; said valve stem secured to said end wall; a casing enclosing a fluid-tight space around said bellows; a tube connected to said casing for conducting a fluid under pressure to said space; a snap bellows mounted in co-axial relation on the first named bellows, said snap bellows filled with a compressible gas; adjustable spring pressed means for retarding a closing movement of said valve, releasable when the valve is near a closed position whereupon the force of air compressed in said snap bellows will quickly complete the closing movement of said valve, said spring pressed means also retarding the initial opening movement of said valve.

4. In a pressure operated valve, a hollow valve body, a partition in said body, said partition having a valve opening, a valve seat around said opening, a valve stem extending coaxially through said opening; a cylindrical bellows having a collapsible side wall and an end wall; said stem extending through said bellows with the upper end thereof secured to said end wall, a casing enclosing a fluid-tight space around said bellows, a tube connected to said casing for conducting a fluid to and from said space, a second bellows mounted within said casing on the first named bellows, said second bellows filled with a compressible gas; a valve head on said stem, said stem projecting through said valve head and valve opening; downwardly tapered member secured to the downwardly projecting end of said stem; the lower portion of said member having a bore, a pin entered on said bore to hold said valve head in co-axial alignment with said valve opening; spring pressed rollers bearing against the sides of said member to retard a closing movement of said valve; said rollers positioned to snap over the upper edge of said member when the valve is moved close to a closed position whereupon the force of the compressed gas in said second bellows will quickly close said valve.

RUTHERFORD H. HUNTER.

REFERENCES CITED

The following references are of record in the file of this patent:

UNITED STATES PATENTS

| Number | Name | Date |
| --- | --- | --- |
| 1,300,717 | Fulton | Apr. 15, 1919 |
| 1,480,942 | McKee | Jan. 15, 1924 |
| 1,768,625 | Olsen | July 1, 1930 |
| 1,841,211 | Ryden | Jan. 12, 1932 |
| 1,995,390 | Hubbard | Mar. 26, 1935 |
| 2,259,280 | Wile | Oct. 14, 1941 |
| 2,362,338 | Anderson | Nov. 7, 1944 |
| 2,365,650 | Shaw | Dec. 19, 1944 |
| 2,372,684 | Roth | Apr. 3, 1945 |
| 2,437,468 | Hunter | Mar. 9, 1948 |